(12) United States Patent
Chari et al.

(10) Patent No.: US 6,380,734 B1
(45) Date of Patent: Apr. 30, 2002

(54) CONTROL ELEMENT ASSEMBLY POSITION VERIFICATION APPARATUS

(75) Inventors: Deva R. Chari, Granby; Edward G. Sirica, East Hartford, both of CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/166,902

(22) Filed: Oct. 6, 1998

(51) Int. Cl.[7] ................................................. G01B 7/14
(52) U.S. Cl. .......................... 324/207.24; 324/207.13; 324/207.22; 322/31; 322/32; 73/313; 73/314; 376/228; 376/258
(58) Field of Search ................................ 376/258, 228; 322/31, 32; 324/207.13, 207.22, 207.24; 73/313, 314

(56) References Cited

U.S. PATENT DOCUMENTS

| | | | |
|---|---|---|---|
| 3,594,740 A | * 7/1971 | Comeau | 340/188 |
| 3,656,074 A | 4/1972 | Bellacqua et al. | 335/206 |
| 3,906,469 A | * 9/1975 | Kronk | 340/188 |
| 4,014,741 A | * 3/1977 | Foxworthy et al. | 176/19 |
| 4,053,355 A | * 10/1977 | Vuckovich | 176/19 |
| 5,333,160 A | 7/1994 | Runde | 376/268 |

FOREIGN PATENT DOCUMENTS

JP          5946890          * 3/1984

* cited by examiner

Primary Examiner—Michael J. Carone
Assistant Examiner—John Richardson (57) ABSTRACT

A position verification apparatus comprising a movable member disposed within and movable with respect to a housing containing the movable member, a means for generating a magnetic field within the housing, a first magnetically responsive means for sensing the position of the movable member and outputting a signal indicative of the position of the movable member, a second magnetically responsive means for sensing the presence of the movable member and outputting a signal indicative of the position of the movable member and a means for comparing the signal output from the first magnetically responsive means and the signal output from the second magnetically responsive means.

19 Claims, 8 Drawing Sheets

CONTROL ELEMENT ASSEMBLY POSITION VERIFICATION APPARATUS

FIELD OF THE INVENTION

The present invention relates generally to an apparatus for verifying the position of a movable member. More particularly, the present invention is directed to a control element assembly (CEA) position indicator that includes a CEA position verification apparatus.

BACKGROUND OF THE INVENTION

Nuclear power plants typically include independent shut-down and safe-operations systems that monitor plant operation and evaluate numerous safety-related parameters. In the event one or more measured parameters indicate the existence of an unsafe condition, the shut-down system designed to mitigate the effects of an anticipated transient condition and/or the safe-operation can automatically effect the appropriate remedial action. It is imperative that these safety control systems, known as plant protection systems, operate reliably, and accordingly, it is imperative that all measured and sensed parameters be valid.

In the context of nuclear plant protection systems, it is not uncommon to measure a multitude of parameters related to plant operation. These parameters include, for example, temperatures, pressures, flow rates, power density, neutron flux, fluid levels, etc. Other functions of the plant protection system include the status-monitoring of various components including valves, pumps, motors, control devices and generators.

Additionally, the plant protection system, under certain defined conditions, may initiate a reactor trip (RT), i.e., the rapid, controlled, and safe shut-down of the reactor by actuating various field systems and remote actuation devices. In the case of a pressurized light water reactor, the shut-down is often accomplished by the dropping of moderating control rods into the reactor core to cause the reactor to become sub-critical.

The rod assemblies are comprised of four or twelve rods joined by a spiderlike connecting flange. Each rod assembly is commonly referred to as a control element assembly (CEA). The CEAs are arranged in groups or sub-groups consisting of a minimum of four CEAs. The connecting flange couples the CEA to a control element assembly drive mechanism that controls the movement of the CEA in and out of the reactor core. The control element assembly drive mechanism normally includes a position indicator that senses location of the CEA. As the CEA controls the overall reactor power level and provides the principal means of quickly and safely shutting down the reactor, sensing and monitoring the CEA's position in a nuclear reactor is imperative.

Figure 1:
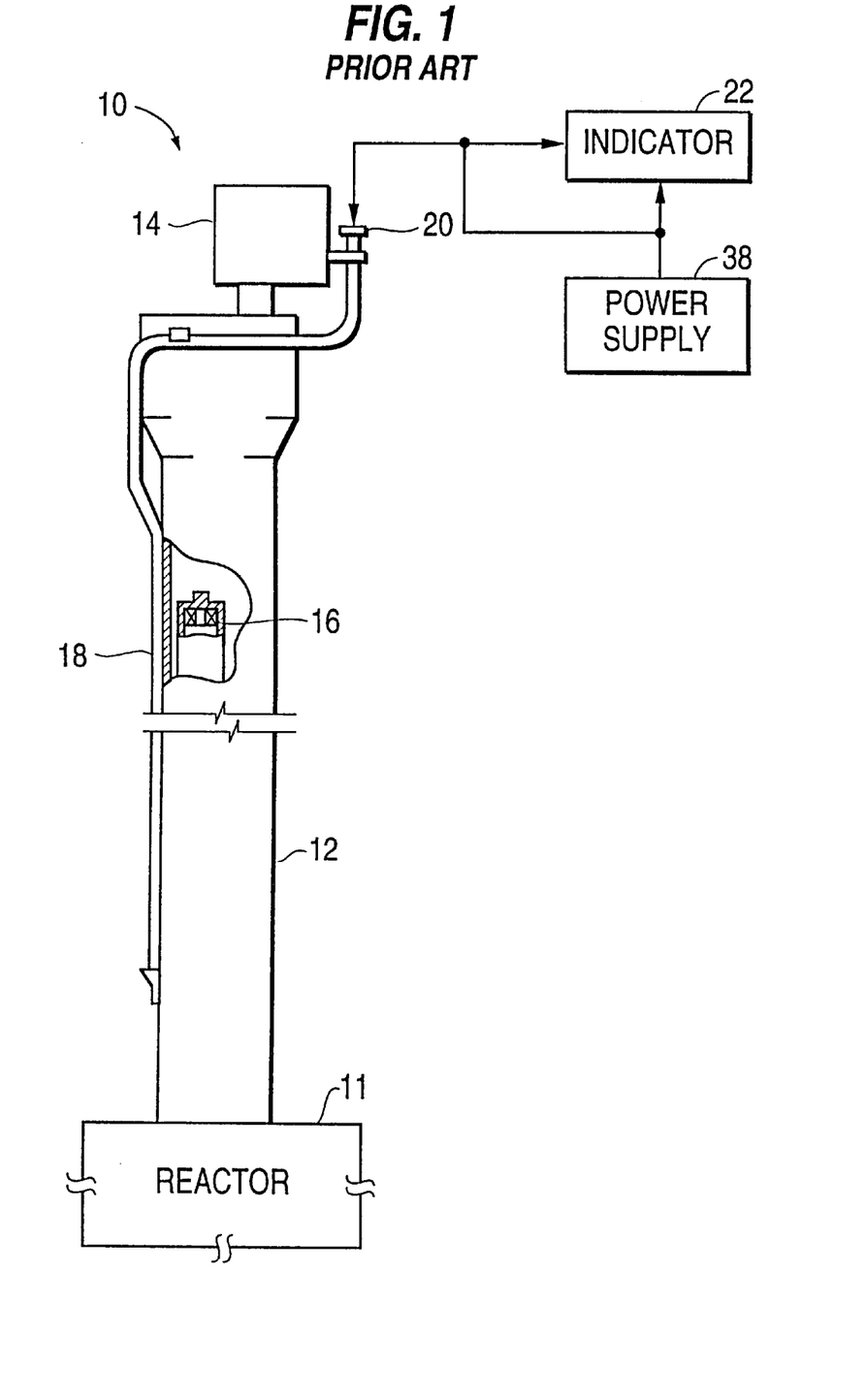
FIG. 1 shows a prior art control rod position sensing apparatus.

There exist well known systems for sensing and monitoring CEA position. In U.S. Pat. No. 3,656,074, which is assigned to the Assignee of the present invention and incorporated herein by reference, there is described a CEA position sensing apparatus 10. As shown in FIG. 1, the apparatus includes a CEA represented by a single control rod located within a control rod housing and a control rod drive motor; a permanent magnet physically positioned on the CEA drive shaft; and a position transmitter including a plurality of flux responsive devices and a voltage divider network.

As the CEA illustrated in FIG. 1 is represented as a single control rod, only one control rod housing 12 is shown extending upwardly from the top of the reactor 11. The control rod housing 12 will typically be a nonmagnetic stainless steel tube that is approximately five inches in diameter having a one inch thick wall. The control rod drive shaft is situated within housing 12, and the control rod itself extends into the main portion of reactor 11.

A control rod drive motor 14 is mounted above a cap which seals the upper end of housing 12. Through appropriate gearing, the control rod drive motor 14 causes the control rod drive shaft to move axially relative to housing 12, thus adjusting the position of the CEA relative to the reactor core. The control rod drive shaft of motor 14 communicates with the interior of housing 12 through specially designed seals that are available commercially.

Permanent magnet 16 is mounted on the control rod drive shaft. The magnet 16 must be constructed of material capable of withstanding the highly corrosive conditions of the environment to which it will be exposed, as the magnet will be located inside a nuclear reactor. Further, the magnet 16 must be sufficiently strong so that its flux field will bridge the thick stainless steel walls of the housing 12.

As described below, a portion of the position sensing apparatus 10 is mounted on the exterior of the housing 12 and is contained within a separate transmitter housing 18. The housing 18 comprises an elongated hollow member, generally of tubular form, comprised of a nonmagnetic material which preferably has a high coefficient of thermal conductivity. The upper end of housing 18 is adapted to receive an electrical connector 20.

The connector 20 provides a means for connecting the position transmitter circuitry to external circuitry in a manner which permits removal of the connector 20 from the housing 18. The connector 20 also electrically couples the output of the position sensing apparatus 10 to a position indicator 22.

Figure 2A:
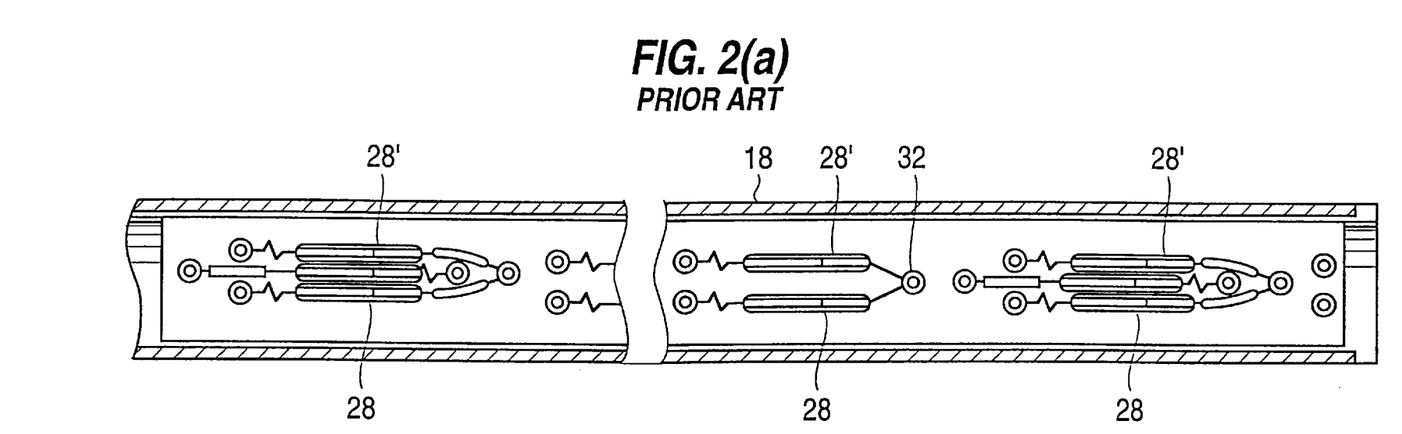
FIG. 2(a) is a plan view of the position sensing apparatus shown in FIGS. 1 and 4, wherein a portion of the housing is cutaway to show the included circuitry of the control rod position sensing device.
Figure 2B:
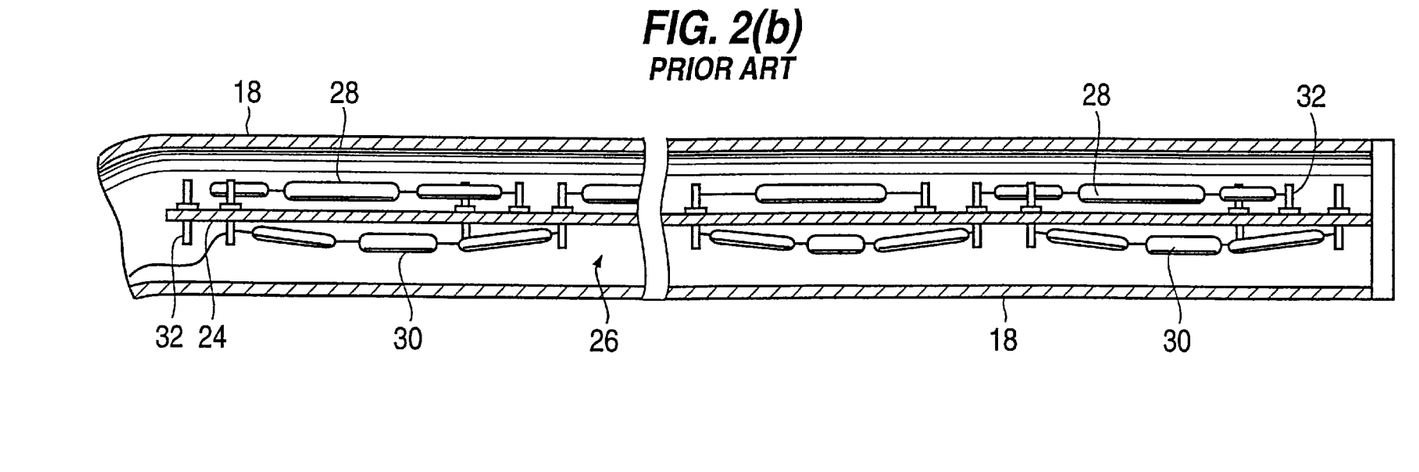
FIG. 2(b) is a side view of the position sensing apparatus shown in FIGS. 1 and 4, wherein a portion of the housing is cutaway to show the included circuitry of the control rod position sensing device.

FIGS. 2(a) and 2(b) respectively show top and side views of the position transmitter circuitry located within the housing 18 through cut-away portions of said housing. Shown within the housing 18 is a terminal strip 24 which is mounted to a reed switch position transmitter 26 including a plurality of magnetic flux responsive switches and the components of an incremental potentiometer. The flux responsive devices are shown as reed switches 28 and 28', and the components of the incremental potentiometer are shown as resistors 30. The reed switches 28, 28' and the resistors 30, are mounted to terminal strip 24 and electrically interconnected by means of standoff and feed through connectors 32. The reed switches 28, 28' are spaced on the terminal strip 24 at uniform incremental distances small enough to insure that at least one of the switches will be actuated from any location of the magnet.

Figure 3:
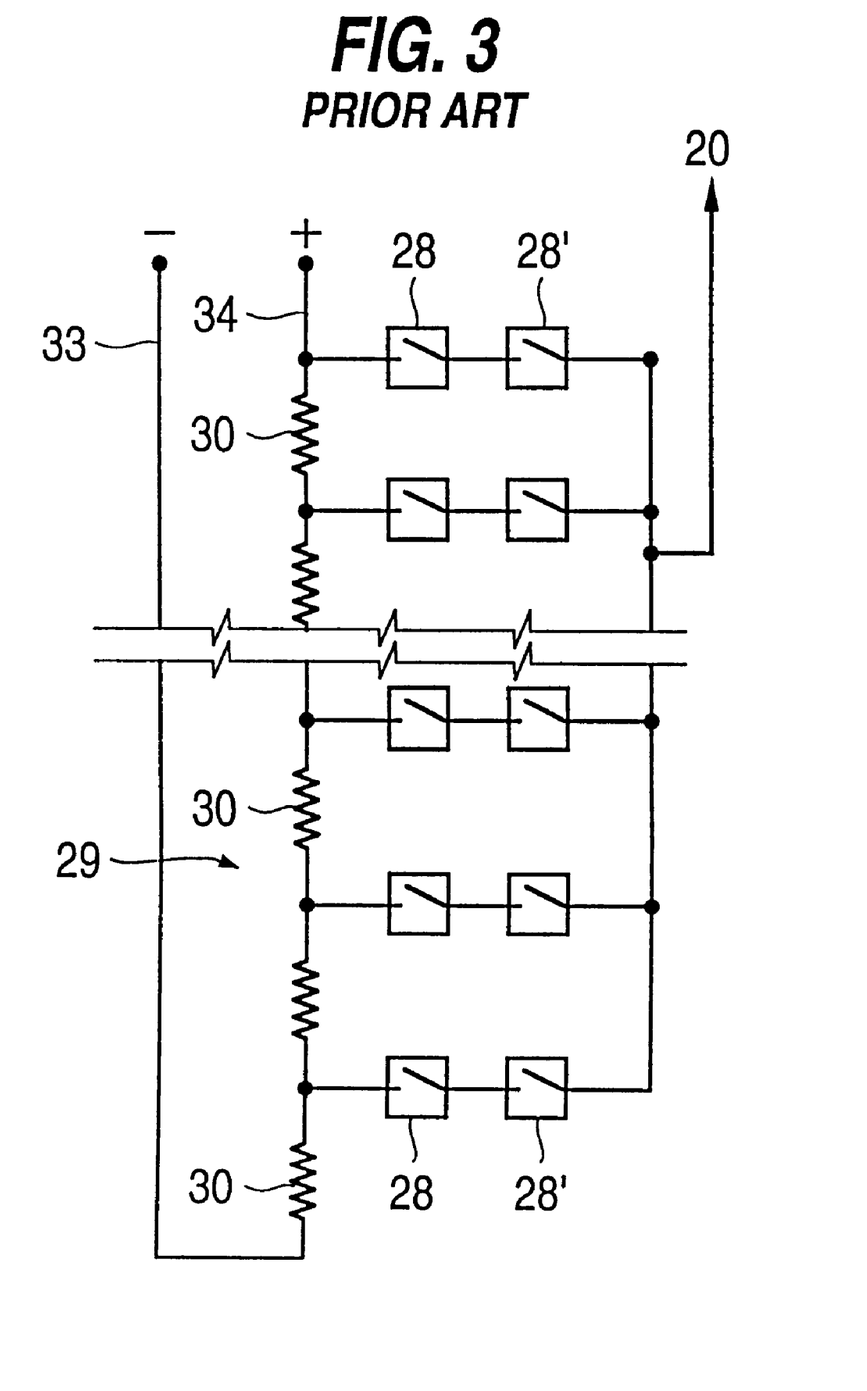
FIG. 3 is a schematic diagram of the electrical circuit of the position sensing apparatus shown in FIGS. 1 and 4.

In the preferred embodiment, the reed switches are wired in pairs as designated in FIG. 3 by the reference numerals 28, 28'. The reed switches 28, 28' have a length of approximately one inch, and are disposed in serial axial alignment parallel to the path of magnet 16. The reed switches 28, 28' forming the reed switch pairs are spaced apart approximately one inch to provide an arrangement wherein a small overlap of switch actuation will occur, thus reducing the possibility of a CEA position at which no switch would be actuated. As the control rod drive shaft travels axially within control rod housing 12, switches 28, 28' will be sequentially closed at the approach of the field of magnet 16 and opened after the magnetic field passes. The switches are arranged such that serially adjacent switches will be closed as the magnet 16 is intermediate the two switches.

With regard to the electrical portion of the position indicating apparatus 10, FIG. 3 shows a plurality of resistors 30 of the same size and type connected at end points 33 and 34 across the power supply 38 (power supply 38 shown in FIG. 1). The resistors 30 form an incremental potentiometer or voltage divider. As discussed above, reed switches 28' are electrically connected in series with each of switches 28, and are positioned in substantially the same locations as switches 28. Each of reed switches 28 is connected to a different point or tab on the voltage divider comprising resistors 30. All of the circuits comprising the series connected switches 28, 28' are connected to a signal bus bar having a terminal point 20. Thus, upon closing of one of the switches 28 and its serially connected back up switch 28', a signal from the incremental potentiometer comprising resistors 30 will be applied to bus bar terminal 20. The amplitude of this signal indicates which switch of switch pair 28, 28' is at that instant subject to the field from magnet 16.

Figure 4:
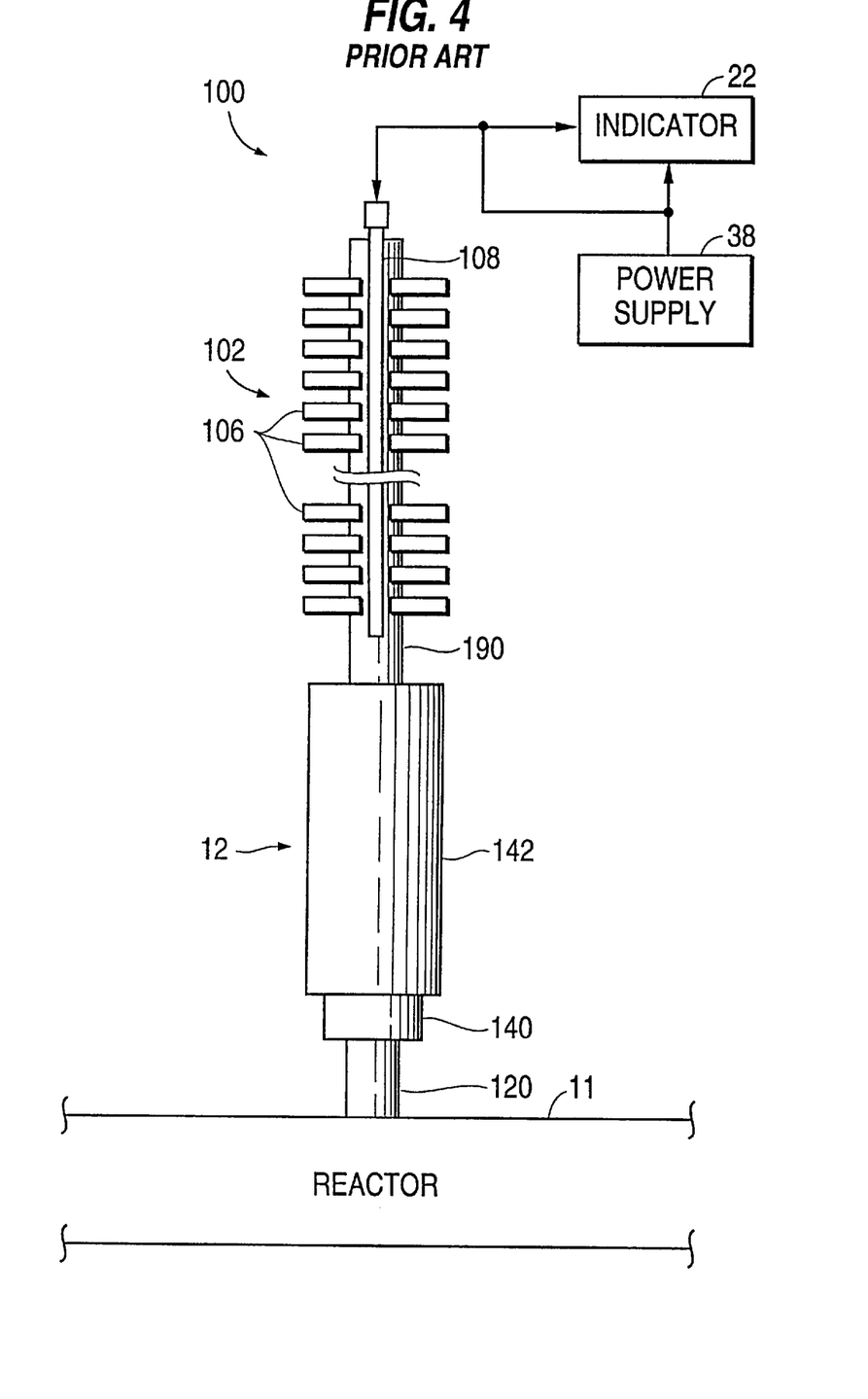
FIG. 4 shows a second prior art control rod position sensing apparatus.
Figure 5:
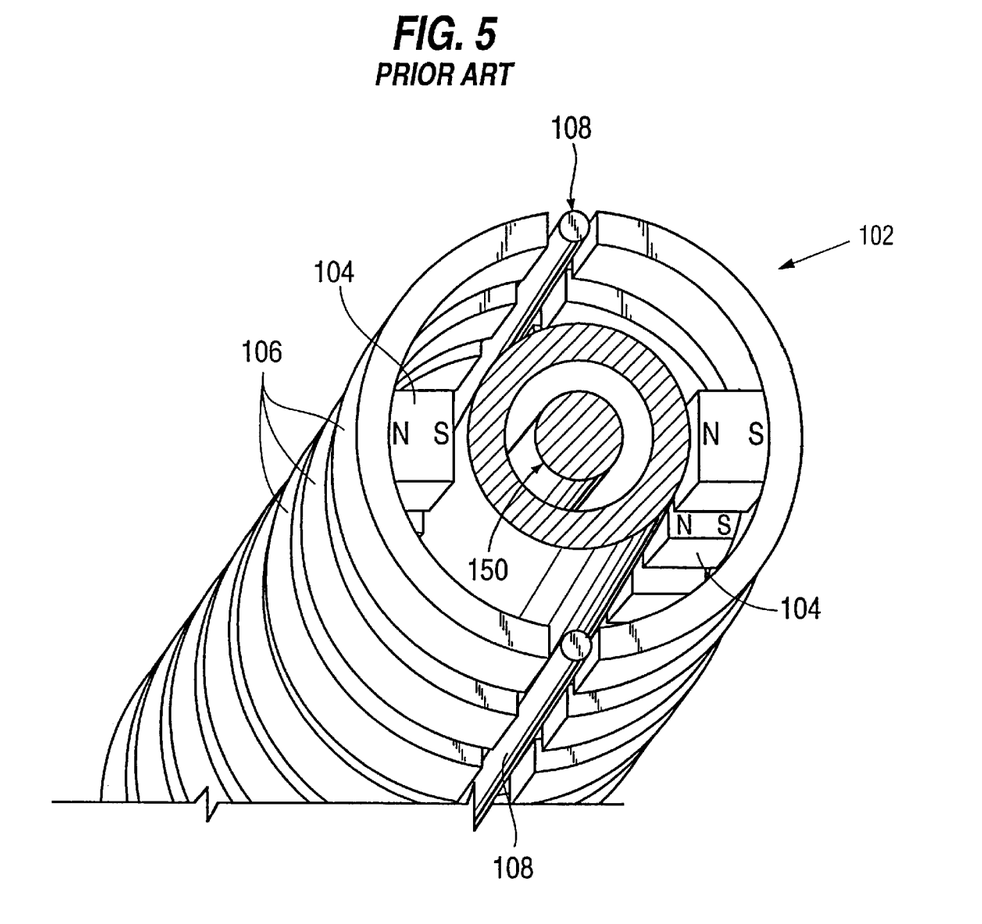
FIG. 5 is a perspective view of the internal structure of the apparatus shown in FIG. 4.

Another system for sensing, monitoring and transmitting an indication of control element assembly (CEA) position is described in U.S. Pat. No. 5,333,160, assigned to Assignee of the present invention and herein incorporated by reference. As shown in FIGS. 4 and 5, the apparatus 100 includes a CEA represented by a single CEA 120 located within housing 140, a plurality of magnetic circuits 102 comprising at least one magnet 104 and at least one acruate-shaped magnetic path 106, and at least one position transmitter assembly 108 including a plurality reed switches 28, 28' or other magnetically responsive switches and a voltage divider network or incremental potentiometer 29.

The CEA 120, housing 140, reed switches 28 and 28', and voltage divider network 29 may take the form of like elements disclosed in U.S. Pat. No. 3,656,074, the explanation of which is incorporated herein by reference. A control rod drive coil stack 142 is mounted on the control rod housing 140. Magnetic flux from the coil stack 142, acting through the stainless steel housing 140 causes the CEA 120 located inside the housing 140 to move axially, thus adjusting the position of the CEA relative to the reactor core. As the CEA 120 is withdrawn from the reactor, a control rod extension shaft 150 moves up into an extension shaft housing 190 above the CEA 120 housing.

The vertical position of the CEA 120 may be detected by determining the position of the extension shaft 150. The CEA 120 position transmitter includes a number of magnetic circuits located on the outside of the extension shaft housing 190 at a predetermined number of elevations. For example, the magnetic circuits may be spaced one inch apart over an eleven foot length of the extension shaft housing 190. Each magnetic circuit has at least one magnet 104, a carbon steel magnetic path 106 surrounding the extension shaft housing 190, and at least one longitudinally extending reed switch position assembly 108. Referring to FIG. 5, there are provided a pair of magnets 104 and a pair of position transmitter assemblies 108 to provide redundant monitoring of CEA's 120 position for increased reliability.

At selected elevations along the direction of travel of the CEA 120, a measurement is made by providing a magnetic circuit around the extension shaft housing 190 which senses the presence of the extension shaft 150, depending on how far the control rod is withdrawn. In the preferred embodiment, the extension shaft 150 is composed of a ferromagnetic material. The strength of the magnetic field in the area of the position transmitter assembly 108 will be dependent on the reluctance of the magnetic circuit, which in turn depends on how much ferromagnetic material is present in the magnetic circuit. Since the ferromagnetic extension shaft 150 moves in the path of the magnetic field, the magnetic field strength at a particular elevation in the area of a particular reed switch 28, 28' will be greater if the extension shaft 150 is at or above that elevation, and less if the extension shaft 150 is below that elevation. The sensitivity of the reed switches 28, 28' is chosen so that the reed switches 28, 28' will close in the stronger magnetic field and open in the lesser field.

FIGS. 2(a) and 2(b), respectively, also show top and side cut-away views of a transmitter circuitry located within the housing 190. Shown within the housing is a terminal strip 24 to which are mounted flux responsive reed switches 28 and 28' and other components of an incremental potentiometer of the position transmitter 108. The reed switches 28 and 28' are spaced along the terminal strip 24 at uniform incremental distances corresponding with each predetermined elevation of the magnetic circuitry.

The other components of the incremental potentiometer 29, resistors 30, are mounted to the terminal strip 24 and are electrically interconnected by means of standoff and feed through connectors 32.

Referring to FIG. 3, a schematic diagram for the electrical portion of the position transmitter assembly 108 is shown. A plurality of resistors 30 of the same size and type are connected at end points 33 and 34 across the power supply 38 to form an incremental potentiometer or voltage divider 29.

Standard reed switch position transmitter (RSPT) systems may result in an unnecessary reactor trip if there are erroneous indications of the location of the control element assembly (CEA) sent to the control element assembly calculator (CEAC). Certain malfunctions may cause CEA position locators to incorrectly report the location of the CEA. These malfunctions may consist of the failure of electrical devices or other components of the system. If any component of the system fails, an incorrect rod position will be input to the CEAC, resulting in the generation of a penalty factor, which is input to the core protection calculator. The core protection calculator uses the penalty factor information, along with other parameters to determine if safety limits are exceeded and initiates a reactor trip if limits will be exceeded. Consequently, a position locator system is needed that may reduce the likelihood of a false CEA position signal.

SUMMARY OF THE INVENTION

Accordingly, it is an object of the present invention to overcome the above-mentioned and other disadvantages of the prior art by providing a position verification apparatus that independently senses and transmits to the control element assembly calculator (CEAC) a signal indicative of the position of the CEA.

It is another object of the present invention to provide a position verification apparatus that may be easily incorporated into existing reed switch position transmitter (RSPT) systems.

It is a further object of the present invention to provide a position verification apparatus that may increase the reliability of current RSPT systems.

It is a further object of the present invention to provide a position verification apparatus that is inexpensive and easy to install on existing nuclear plants.

To achieve the foregoing and other objects, and in accordance with the purpose of the present invention, as embodied, this invention may comprise a movable member disposed within and movable with respect to a housing containing the movable member, a means for generating a magnetic field within the housing, a first magnetically responsive means for sensing the position of the movable member within the housing and outputting a signal indicative of the position of the movable member, a second magnetically responsive means for sensing the presence of the movable member and outputting a signal indicative of the position of the movable member and a means for comparing the signal output from the first magnetically responsive means and the signal output from the second magnetically responsive means.

In an alternative embodiment, the components of the position transmitting apparatus, the first and second magnetically responsive means and the voltage divider network, may be contained within a transmitter housing positioned adjacent to the housing containing the movable member. The means for generating the magnetic field may include a permanent or an electrically excited magnet. The magnet generates a magnetic field proximate the movable member. Thus, the magnetic field is strongest in the housing at the point immediately adjacent the movable member and closest to the source of the magnetic field. Consequently, as the movable member travels axially within the housing, the intensity of the field strength at various points within the housing varies depending on the location of the movable member.

The first magnetically responsive means includes a plurality of switch means such as reed switches. The reed switches are electrically connected to a voltage divider network, and are uniformly spaced apart a predetermined vertical distance such that at least one switch is always energized, closed. The reed switches are electrically coupled to a connector that receives an input signal from the reed switches that is indicative of the position of the movable member.

The second magnetically responsive means also comprises a plurality of reed switches spaced apart a predetermined vertical distance. The reed switches comprising this second set of reed switches are electrically coupled to a signal contact which receives a signal from the second set of switches indicative of the position of the movable member.

When the position transmitting apparatus is installed on a nuclear plant, the movable member is replaced by a control element assembly (CEA). The control element assembly calculator (CEAC) receives the signal from the signal contact (described above) electrically associated with the first set of switches and that from the signal contact electrically associated with the second set of switches. The CEAC compares the signal from the first set of switches with that received from the second set of switches to determine the value of any penalty factors, if any, that must be generated to control the reactivity of the reactor. If the output from the first set of switches and the second set of switches is inconsistent with regard to the location of the movable member, the signals are ignored. If the output from the first set of switches indicates that the CEA is at a particular location and the output from the second set of switches confirms that the CEA is not at the top, the location of the CEA is assumed to be as indicated by the first set of switches.

Finally, the position verification apparatus includes a display for visually representing the position of the movable member.

In operation, the switches forming the first set of magnetically responsive switches sequentially open and close as the magnetic field of the magnet becomes intermediate the axial position of a particular switch. The strength of the magnetic field causes the switch to close. The switches are arranged such that at least one switch forming the plurality of switches comprising the first set of switches is always closed.

The second set of magnetically responsive switches are located primarily at a position corresponding to the CEA being withdrawn to the top of the core. At least one switch included in this second set of switches will remain closed, activated, as long as the CEA is positioned so that the CEA is outside the reactor core. Once the CEA penetrates the reactor core, at least one switch included in the second switches will remain open, indicating that the CEA is no longer positioned at the top of the core, but is positioned within the core.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 6A:
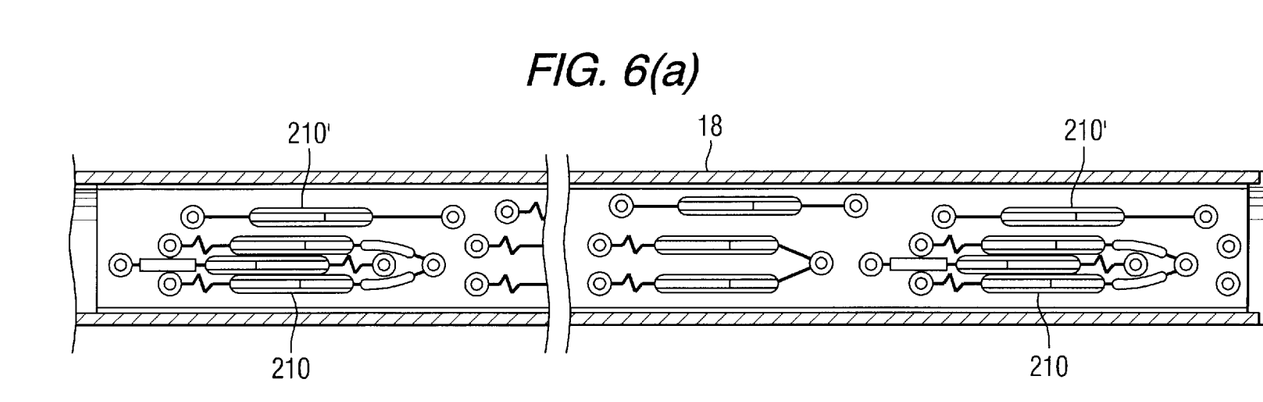
FIG. 6(a) is a plan view of a control rod position verification apparatus formed in accordance with the teachings of the present invention, wherein a portion of the housing is cutaway to show the included circuitry of the control rod position sensing device.

FIG. 6(a) shows a plan view of a position verification apparatus 200 formed in accordance with the teachings of this invention. The present invention may be incorporated into existing reed switch position transmitters (RSPT) to provide a verification of the position of the CEA indicated by the RSPT. For example, the position verification apparatus 200 may be incorporated into the RSPT systems described herein in FIGS. 1–5. For illustration purposes only, the disclosed embodiment shows the position verification apparatus 200 incorporated as a component part of a RSPT system of the type described in FIG. 1. In this application, the apparatus 200 is used to verify the position of the CEA as determined by the RSPT system. It will be appreciated, however, that the use of the position verification apparatus 200 is not limited to the disclosed application.

Figure 6B:
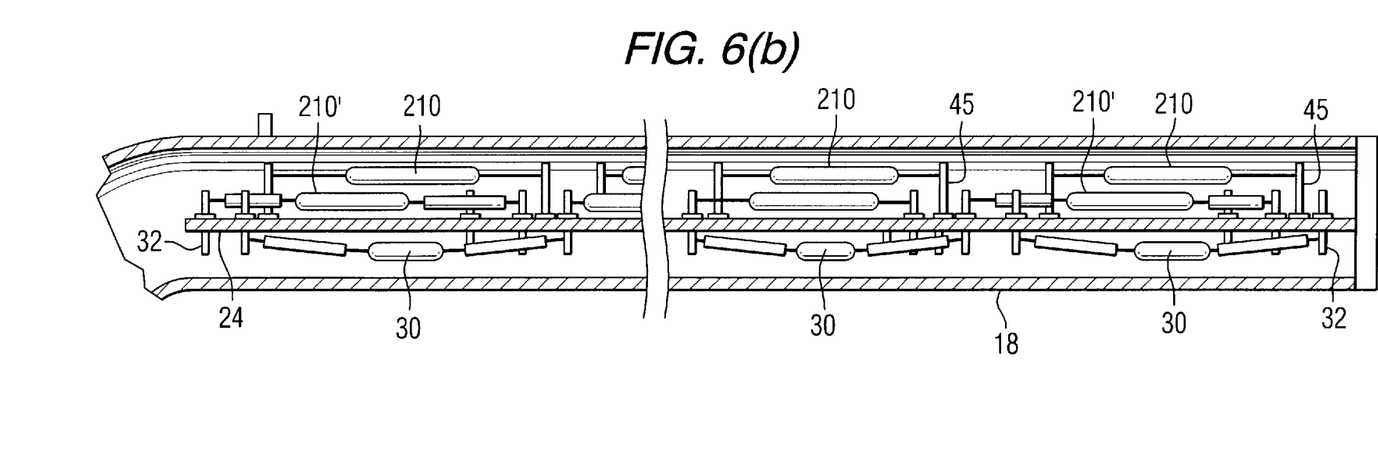
FIG. 6(b) is a side view of a control rod position verification apparatus formed in accordance with the teachings of the present invention, wherein a portion of the housing is cutaway to show the included circuitry of the control rod position sensing device.

The position verification apparatus 200 includes a plurality of magnetically responsive switches 210, contained within housing 18. The responsive switches 210, are mounted to a terminal strip 24 and electrically interconnected by means of standoff and feed through connectors 32. Care is taken to ensure that the length of the standoff connectors 45 is not so great as to make electrical contact with the inner wall of the housing 18. Further, the leads of the responsive switches 210 may be insulated to prevent unwanted electrical contact. One of ordinary skill in the art will appreciate that a terminal strip containing a printed circuit board rather than standoff and feed through connectors may be used for component connection.

In the preferred embodiment, the position verification apparatus 200 includes five (5) responsive switch pairs 210, 210', wherein the switches forming the switch pairs are electrically connected in series. The number of switches included as components of the position verification apparatus 200 will depend on the size, type and magnetic responsiveness of the switches selected and the strength of the magnetic field generated within the housing 18.

Typically, reed switches of the type used in the position verification apparatus 200 have a length of approximately one inch. The switch pairs 210, 210' are uniformly spaced apart on the terminal strip 24 at a predetermined interval. In the preferred embodiment, the reed switch pairs 210, 210' are electrically connected such that the switches forming the switch pair are located at substantially the same location within the housing 18. The upper most switch pair 210, 210' is located at approximately 154⅛ inches from the bottom edge of the control rod housing 12. The switch pairs 210, 210' are spaced along the housing 18 such that there is approximately 1½ inches of vertical distance between successive switch pairs. The reed switch pairs 210, 210' are disposed in serial axial alignment parallel to the path of the control rod. Arranging the switch pairs 210, 210' in the disclosed manner provides an arrangement wherein a small overlap of switch actuation will occur, thus reducing the possibility of a CEA position at which no switch would be actuated. As the CEA travels axially within the control rod housing 12, one or more of the switch pairs 210, 210' will be sequentially closed at the approach of the magnet 16 and opened after the magnet 16 passes. The switch pairs 210, 210' are arranged such that two adjacent switches will be closed when the magnet 16 is intermediate the two switches, as the field strength causes the switches 210, 210' to close.

All of the circuits comprising the series connected switches 210 and 210' are connected to signal contacts 27, 27'. The signal from signal contacts 27, 27' and that from the reed switch position transmitter (RSPT) of apparatus 10 are input into a control element assembly calculator (CEAC). The CEAC considers the location of the CEA in determining the value of any penalty factors needed to control the reactivity of the core. The CEAC calculates the penalty factors using algorithms currently known and used in existing RSPT/CEAC systems.

Figure 8:
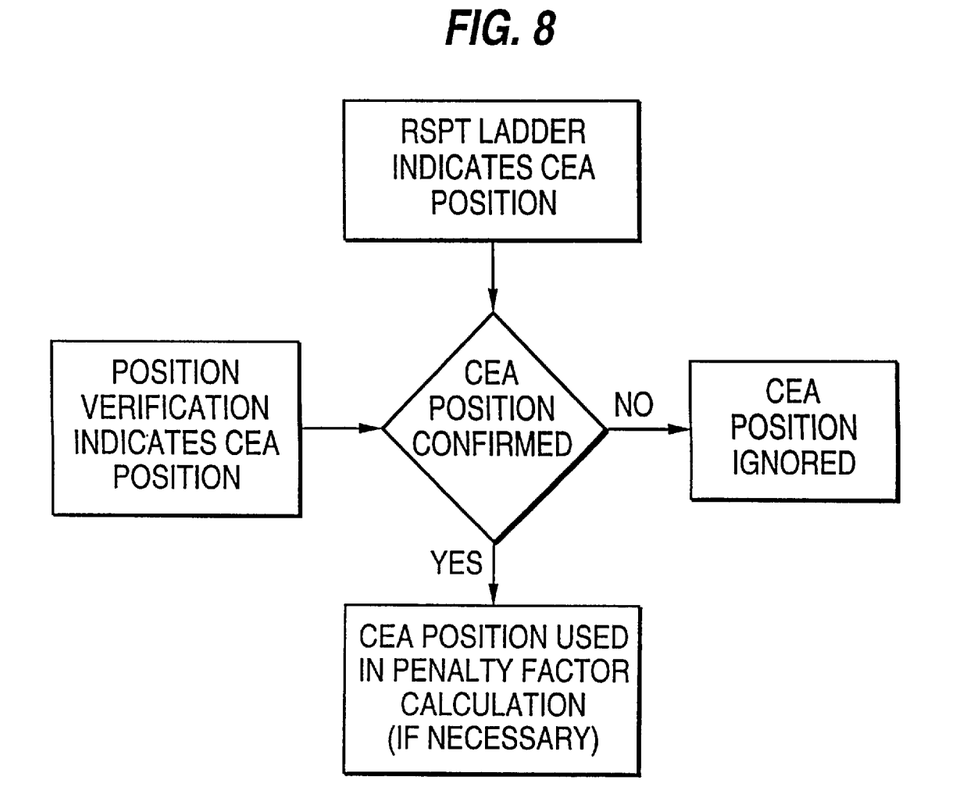
FIG. 8 is a flow chart showing the logic employed by a control element assembly calculator formed in accordance with the teachings of this invention.

In the present invention, the CEAC compares the signal from contact signals 27, 27' with that from the RSPT of position indicating apparatus 10. As illustrated in FIG. 8, the CEAC will calculate any required penalty factors needed to adjust the reactivity of the core only if the information from the RSPT of apparatus 10 as to CEA position is consistent with that received from the position verification apparatus 200. For instance, if the signal from the RSPT of apparatus 10 indicates that the CEA is at the top of the core, and the signal 27 from the position verification apparatus 200 indicates that the CEA is at top of the core (at least one switch pair 210, 210' being closed), the signal is deemed valid, and the CEA position should be used in the CEAC calculation to determine any necessary penalty factors. On the other hand, if the signal from the RSPT of apparatus 10 indicates that the CEA is at the top of the core and the position verification apparatus 200 indicates that the CEA is not at the top of the core (switch pairs 210, 210' open), the signal is not valid, and the CEA position will not be used in CEAC calculations in determining penalty factors. Additionally, if the RSPT of apparatus 10 indicates that the CEA is at an intermediate position within the core and the position verification apparatus 200 indicates that the CEA is at the top of the core, the signal is not deemed valid. Likewise, if the signal from the RSPT of apparatus 10 indicates that the rod is at some intermediate position within the core and the signal from the position verification apparatus 200 indicates that the CEA is at some position within the core (switches 210, 210' open), the signal is deemed valid, and the CEA position is used by the CEAC in calculating any necessary penalty factors.

Tables 1 and 2 illustrate the operation of a CEAC using prior software logic and that of a CEAC designed in accordance with the teaching of this invention.

TABLE 1

PRIOR SOFTWARE LOGIC

| RSPT Ladder Indicates CEA at Top | RSPT Ladder Indicates CEA at Intermediate Position | Consequences |
| --- | --- | --- |
| Yes | | 1 |
| | Yes | 2 |

Consequence 1: Signal is valid and CEA position should be used in downstream calculations. (Since CEA is at top of the core no adverse consequences will result).
Consequence 2: Signal is valid and CEA position should be used in downstream calculations. Even if the CEA is actually at top of the core, a malfunction in the signal would result in the indicated CEA position being used in downstream calculations and potentially result in unnecessary reactor trip.

TABLE 2

MODIFIED SOFTWARE LOGIC

| RSPT Ladder Indicates CEA at Top | RSPT Ladder Indicates CEA at Intermediate Position | Additional Contact Switches Closed | Additional Contact Switches Open | Consequences |
| --- | --- | --- | --- | --- |
| Yes | | Yes | | 1 |
| Yes | | | Yes | 2 |
| | Yes | Yes | | 2 |
| | Yes | | Yes | 1 |

Consequence 1: Signal is valid and CEA position should be used in downstream calculations.
Consequence 2: Signal is not valid and CEA position should not be used in downstream calculations. By incorporating this logic in the software, unnecessary reactor trips can be avoided due to signal malfunctions.

Figure 7:
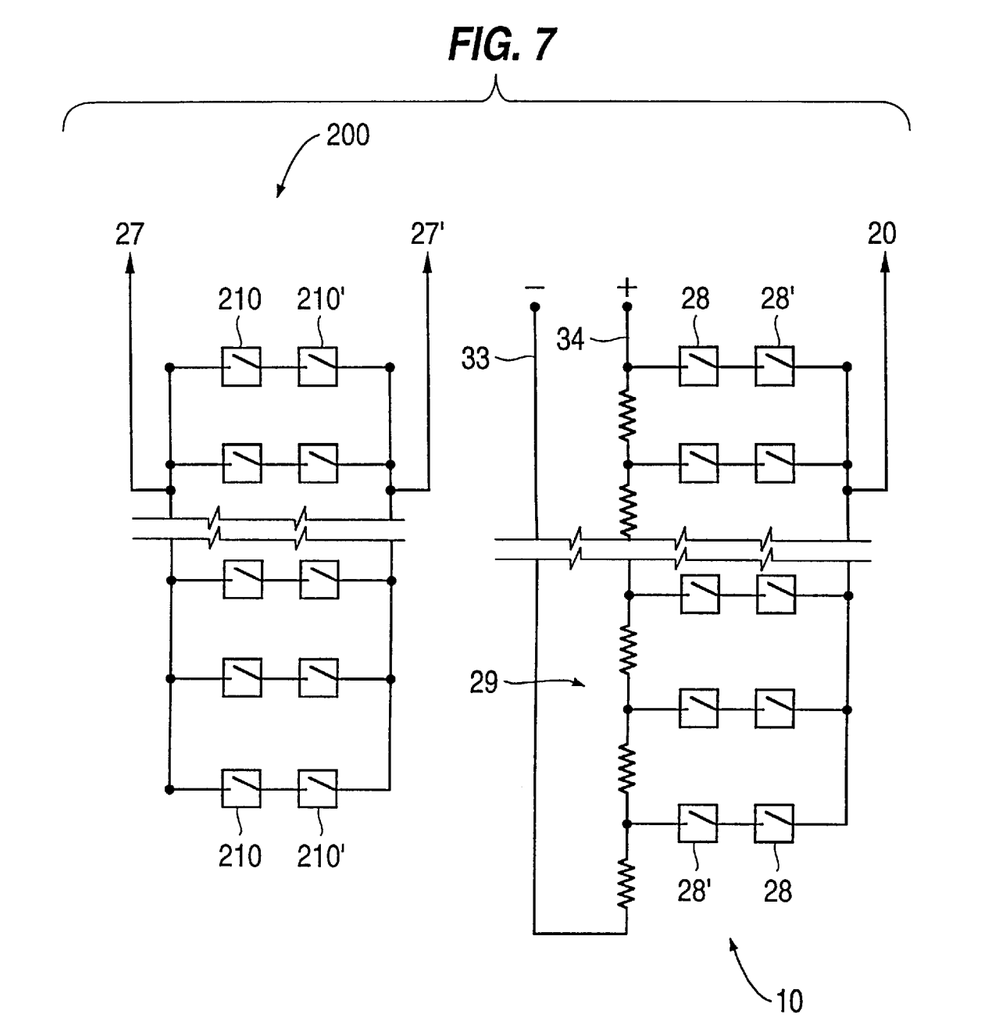
FIG. 7 is a circuit diagram of the position verification apparatus shown in FIGS. 6(a) and 6(b)

FIG. 7 shows an electrical schematic for the position verification apparatus 200 and position indicating apparatus 10. The voltage divider network forming an element of the present invention is identical to that shown in FIG. 3, the discussion of which is incorporated herein by reference. With regard to the position verification apparatus 200, as discussed above, all of the circuits comprising the series connected switches 210, 210' are connected to the signal contacts 27, 27'. Thus, upon the closing of one of the switches 210 and its serially connected back-up switch 210', the signal from the signal contacts 27, 27' will be applied to the CEAC. As discussed above, the CEAC compares the signal from the contact signal 27 to determine the value, if any, of penalty factors needed to adjust the reactivity of the reactor.

The addition of the contact signal from contact signals 27, 27' in the present invention permits verification of the information provided to the CEAC concerning the position of the CEA as indicated by the RSPT of apparatus 10. The present invention, thus, may reduce the number of unnecessary reactor trips associated with faulty CEA position indicators.

There are a variety of configurations which may be employed to fabricate position verification apparatus 200. For example, the system 200 need not include the redundant reed switch 210', nor does the position sensing apparatus 10 require the redundant switch 28'. These redundant switches 210' and 28' provide a back-up should one switch of the switch pair fail in the closed position. Thus, the disclosed embodiments are given to illustrate the invention. However, they are not intended to limit the scope and spirit of the invention. Therefore, the invention should be limited only by the appended claims.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An apparatus for verifying the position of a movable member, the movable member being disposed within and movable with respect to a first housing, the apparatus comprising:

means for generating a magnetic field within the first housing;

first magnetically-responsive means extending a first length in the first housing for sensing the position of the movable member within the first length within the first housing and outputting a first signal indicative of the position of the movable member;

second magnetically-responsive means extending a second length less than the first length for sensing the presence of the movable member within the second length and outputting a second signal indicative of the presence of the movable member anywhere within the second length; and means for comparing the first signal with the second signal to verify the position of the moveable member.

2. An apparatus for verifying the position of a movable member as defined in claim 1, wherein the magnetic means for generating a magnetic field includes a permanent magnet supported by the movable member.

3. An apparatus for verifying the position of a movable member as defined in claim 1, wherein the first magnetically-responsive means is supported within a second housing positioned adjacent the first housing, the first magnetically-responsive means including a plurality of magnetic field-responsive switches electrically connected to a voltage divider network.

4. An apparatus for verifying the position of a movable member as defined in claim 3, wherein the plurality of magnetic field-responsive switches comprise reed switches that are sequentially opened and closed during the travel of the movable member.

5. An apparatus for verifying the position of a movable member as defined in claim 4, wherein the reed switches forming the plurality of reed switches are uniformly spaced apart so that one switch is always energized.

6. An apparatus for verifying the position of a movable member as defined in claim 3, wherein the voltage divider network includes a plurality of resistors.

7. An apparatus for verifying the position of a movable member as defined in claim 1, wherein the second magnetically responsive means includes a plurality of reed switches.

8. An apparatus for verifying the position of a movable member as defined in claim 1, wherein the apparatus further includes an indicating means for displaying the position of the movable member.

9. An apparatus for verifying the position of a movable member wherein the movable member is disposed within and movable with respect to a first housing and a magnet generates a magnetic field intermediate the movable member, said apparatus comprising:

a position sensing apparatus supported by a second housing located adjacent said first housing, said positioning sensing apparatus including a first plurality of magnetically-responsive switches electrically connected to a voltage divider network and extending a first length in the first housing wherein each switch of said plurality of switches is positioned at a different location on the voltage divider network, the position sensing apparatus outputting a position signal indicative of the position of the movable member within the first length;

a position verification apparatus including a second plurality of magnetically-responsive switches extending a second length less than the first length, wherein said position verification apparatus outputs a verification signal indicative of the presence of the movable member anywhere within the second length; and a comparison apparatus for comparing the position signal with the verification signal to verify the position of the moveable member.

10. An apparatus for verifying the position of a movable member as defined in claim 9, wherein the first plurality of magnetically responsive switches are uniformly spaced apart.

11. An apparatus for verifying the position of a movable member as defined in claim 9, wherein the second plurality of magnetically responsive switches are uniformly spaced apart.

12. An apparatus for verifying the position of a movable member as defined in claim 9, wherein the switches forming the first and second plurality of magnetic switches are located at different locations along the direction of travel of the control rod.

13. An apparatus for verifying the position of a movable member as defined in claim 9, wherein the movable member is constructed of a ferromagnetic material.

14. An apparatus for verifying the position of a movable member as defined in claim 9, wherein the apparatus further includes an indicating means for displaying the position of the movable member.

15. An apparatus for verifying the position of a movable member comprising:

a movable member being disposed within and movable with respect to a first housing;

a magnet supported by the movable member for generating an electric filed;

a position sensing apparatus supported by a second housing located adjacent said first housing, said position sensing apparatus including a first plurality of switches extending a first length in the first housing and electrically connected to a voltage divider positioned at a different location on the voltage divider sensing apparatus outputting a first signal indicative of the position of the movable member within the first length;

a position verification apparatus including a second plurality of switches extending a second length less than the first length, wherein said position verification apparatus outputs a second signal indicative of the presence of the movable member anywhere within the second length; and a processor for comparing the first signal with the second signal to verify the position of the moveable member.

16. An apparatus for verifying the position of a movable member as defined in claim 15, wherein each of the first plurality of switches is a magnetically-responsive switch.

17. An apparatus for verifying the position of a movable member as defined in claim 15, wherein each of the second plurality of switches is a magnetically-responsive switch.

18. An apparatus for verifying the position of a movable member as defined in claim 15, wherein the first and second plurality of switches are located at different locations along the direction of travel of the control rod.

19. An apparatus for verifying the position of a movable member as defined in claim 15, wherein the apparatus further includes an indicating means for displaying the position of the movable member.

* * * * *